United States Patent [19]
Pfeiffer et al.

[11] 3,734,400
[45] May 22, 1973

[54] PROCESS FOR THE PREPARATION OF DRY THERMOPLASTIC SYNTHETIC RESIN POWDERS FROM LIQUEFIED GAS SUSPENSIONS

[75] Inventors: Kurt Pfeiffer; Johannes Dietrich; Karl-Heinz Schonberg; Gunter Beckmann, all of 4370 Marl, Germany

[73] Assignee: Chemische Werke Huls Aktiengesellschaft, Marl, Germany

[22] Filed: Dec. 15, 1971

[21] Appl. No.: 208,065

[30] Foreign Application Priority Data
  Dec. 17, 1970 Germany.................P 20 62 192.5

[52] U.S. Cl......................233/11, 233/13, 233/19 R
[51] Int. Cl. ............................................B04b 15/02
[58] Field of Search..........................233/1 R, 11, 13, 233/15, 18, 27, 28, 19 R; 34/8

[56] References Cited

UNITED STATES PATENTS

| | | | |
|---|---|---|---|
| 2,524,816 | 10/1950 | Lyons | 233/18 X |
| 3,001,293 | 9/1961 | Wendt | 233/18 X |

FOREIGN PATENTS OR APPLICATIONS

| | | |
|---|---|---|
| 1,240,287 | 5/1967 | Germany |
| 677,870 | 3/1966 | Belgium |

*Primary Examiner*—George H. Krizmanich
*Attorney*—Craig, Antonelli and Hill

[57] ABSTRACT

A process and apparatus for obtaining dry thermoplastic synthetic resin powders from suspensions of powdery polymers in liquefied gases by centrifuging such a suspension to remove a majority of the liquefied gas, drying the resultant moist powder with a superheated gaseous current of the liquefied gas, and introducing the gaseous entrained powder into a first cyclone to obtain a dry thermoplastic synthetic resin powder as the bottoms product. The top of the first cyclone is connected to a second cyclone which separates the incoming mixture into a light phase and a heavy phase. The light phase is heated and then recycled as the super-heated gaseous current of liquefied gas to dry the previously noted moist powder. The heavy phase is condensed and recycled back to the incoming suspension to form a closed system. The amount of heavy phase is dependent upon the superatmospheric pressure of the system as regulated by a valve adjacently connected to the bottom of the second cyclone.

15 Claims, 1 Drawing Figure

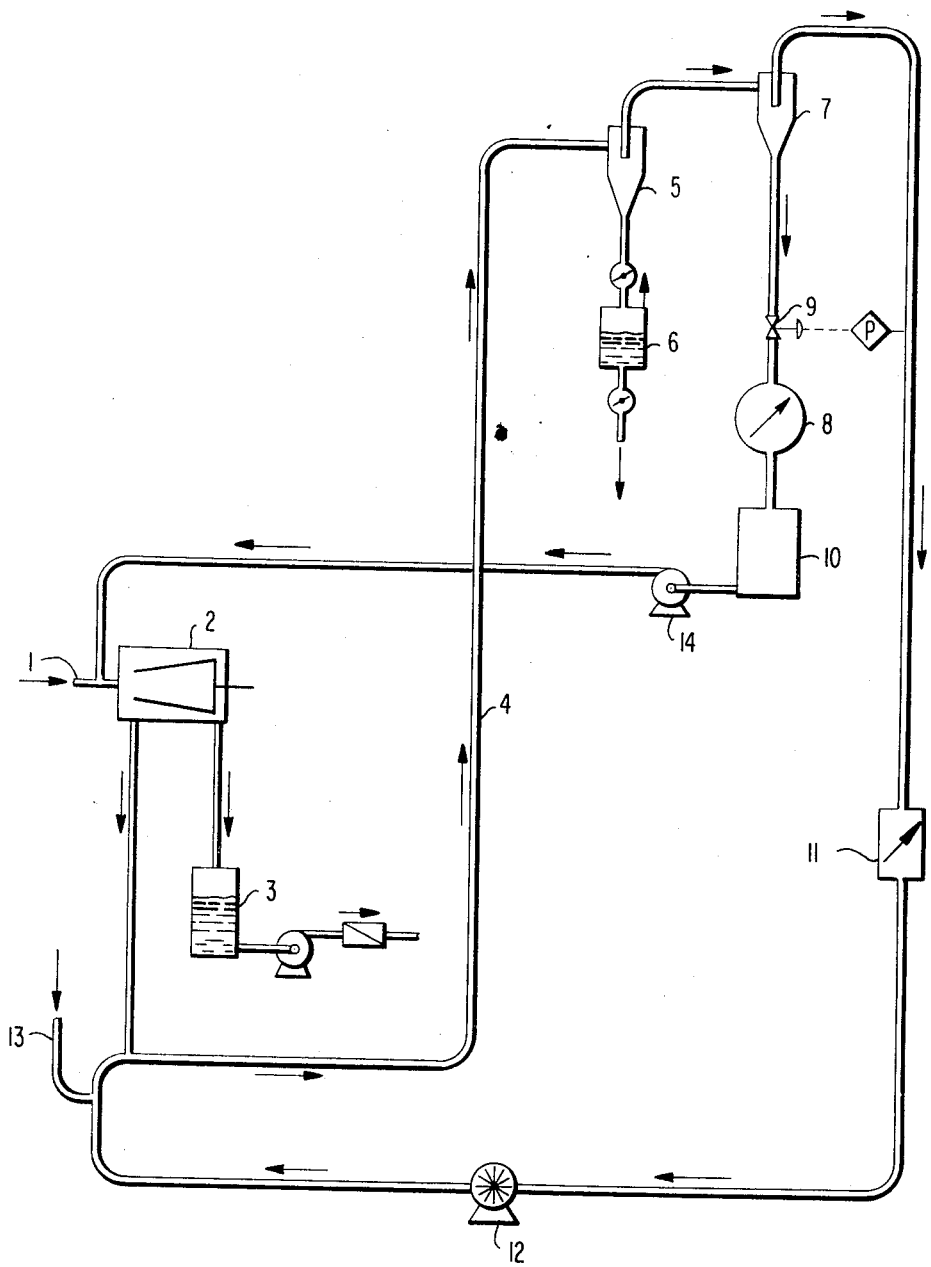

PROCESS FOR THE PREPARATION OF DRY THERMOPLASTIC SYNTHETIC RESIN POWDERS FROM LIQUEFIED GAS SUSPENSIONS

BACKGROUND OF THE INVENTION

This invention relates to a process for the preparation of dry thermoplastic synthetic resin powders from suspensions of powdery polymers in liquefied gases (liquid gases) and to an apparatus for conducting the process.

Polymerizations wherein the polymer is produced as a powder suspended in a liquefied gas can be conducted with the aid of a number of catalyst systems, e.g. so-called Ziegler catalysts or radical-forming catalysts. Thus, for example, bulk polymerizations of propylene, 1-butylene, or vinyl chloride yield the polymer in the form of a suspended powder.

Suspensions of polymers in liquefied gases are also produced by the polymerization of one or more components from liquefied gas mixtures as they are obtained in refineries, for example from so-called $C_4$-cuts, while the unpolymerized portion of the liquefied gas serves as the carrier liquid for the suspension.

In those polymerizations where the polymer is first present in a solution, the polymer is precipitated and is thus obtained in the form of a suspended powder. This is the case in the production of copolymers of 1-butene and 1,3-butadiene and/or isobutene.

In order to obtain the products of such polymerization processes, it is necessary to isolate the polymer, suspended as a powder, and free same from the residual liquefied gases, i.e., dry the powdery polymer.

In this connection, care must be taken in case of several products, e.g. in case of polypropylene and polybutylene, that the so-called atactic polymer, which is soluble in the liquefied gas, does not remain in the isotactic polymer powder, but rather is obtained separately.

The conventional methods for the processing of powders from suspensions in water, hexane, heptane, toluene, benzene, or similar substances reside in the use of mechanical separators and thermal dryers employed thereafter (Russian Pat. 193,716; "Aufarbeitungstechnik" (Processing Technique) No. 11, 1969, p. 680). Suitable mechanical separators in this connection are: vacuum filters, plane filters, rotary cell filters, batch centrifuges, peeler centrifuges and decanting centrifuges. As the thermal dryers, the following are employed: fluidized-bed dryers, current dryers, rotary tube dryers, rotary disk dryers, or drum dryers. The systems operate at atmospheric pressure. The suspension is introduced into the separator where the main quantity of the liquid phase is separated from the powder. The powder with residual moisture adhering thereto falls from the separator into the dryer, where it is dried with the aid of air or nitrogen.

However, it is impossible to conduct the working-up operation for disclosed liquefied gas suspensions in accordance with these processes, because the liquefied gas evaporates from the suspension immediately upon entering the separator, whereby the separating effect of the apparatus is strongly impaired or ceases entirely. Also the drying of powders with liquefied moisture adhering thereto in thermal dryers with the aid of nitrogen as the drying medium causes problems since the recovery of the liquefied gas from the nitrogen can be effected only by condensation at very low temperatures or by an expensive compression step with subsequent cooling or by complicated absorption processes.

In German Pat. 1,240,287, a process is proposed wherein a continuous bulk polymerization of polyvinyl chloride is conducted in an agitator-equipped reactor, thus producing a liquefied gas suspension of polyvinyl chloride. The polyvinyl chloride powder is then discharged from the reactor with the aid of a twin-screw extruder, the latter being in direct connection with the reactor. The viscous melt in front of the die plate (breaker plate) of the extruder seals the interior of the reactor, which is under excess pressure, against the outside atmosphere. In this procedure, the polymer is obtained in granular rather than powder form.

This process has a very limited range of application. It is impossible to carry out washing and extracting procedures on the suspension which are often necessary to remove catalyst residues. Also, it is not readily possible to remove liquefied gas from the processing chamber for the purpose of eliminating gradually accumulating impurities, by-products, catalyst poisons, etc. Furthermore, the applicability of the process is restricted due to the fact that dangerous operating conditions can arise in certain cases when the melt seal at the die plate of the extruder is not entirely effective. This danger exists, in particular, during the start-up or during interruptions in operation.

Suspensions of polyvinyl chloride in the liquefied gas vinyl chloride are also produced in the bulk polymerization process described in Plastics 25 (1960), No. 272, pp. 225–226 and in Belgian Pat. No. 677,870. However, in this process, the requirement of isolating the powder from a liquefied gas suspension does not exist because the suspension is merely an intermediate stage of a two-stage process, wherein the polymerization is continued until a power, moist with vinyl chloride, has been formed. The residual vinyl chloride is then removed from the powder simply by expansion and subsequent evacuation.

It appears, at first glance, that the obvious method for obtaining powders from suspensions is by means of expansion and evacuation. However, such a process exhibits the disadvantage that a very large amount of liquefied gas must be vaporized, which means a large consumption of time and energy. In addition, the powder is obtained in a stirred vessel from which it is discharged only with difficulty, in certain cases even manually. In case of polypropylene and polybutene, this process also has the additional disadvantage that it offers no possibility for the separate production of the atactic material. Finally, tacky residues occur in some products during the evaporation of large proportions of liquefied gas from suspensions. These residues lead to the formation of powder lumps and wall deposits.

SUMMARY OF THE INVENTION

The present invention is based on the problem of finding an economical process to obtain dry powders from powdery polymers suspended in liquefied gases.

This problem is solved, according to the invention, by separating the suspension under a pressure of 0.5 – 15 atmospheres gauge by means of centrifugation into liquefied gas and power with adhering liquefied gas moisture; subsequently contacting the powder moist with liquefied gas with a superheated liquefied gas identical to the moist liquefied gas adhering to the powder, but being in the gaseous phase, wherein the powder is entrained by the gaseous stream, thereafter separated, and discharged; condensing a proportion of the liquefied gas equal to that of the entrained liquefied gas moisture, reintroducing the same to the suspension; and heating and returning the remaining proportion of the liquefied gas to the powder moist with liquefied gas.

The invention likewise relates to an apparatus for conducting the above process comprising a decanting centrifuge having filtrate draw-off and powder discharge pipes; a filtrate vessel connected to the filtrate draw-off pipe of the centrifuge; a gas convection dryer in communication with the powder discharge pipe of the centrifuge; two cyclones connected in series downstream of the dryer, the first cyclone communicating with the atmosphere through its solids discharge end via a pressure lock and the second cyclone communicating with a condenser through its solids discharge end via a pressure control valve; the condenser communicating with the inlet of the decanting centrifuge via a condensate tank and a pump; and the gas outlet of the second cyclone communicating with the inlet of the gas convection dryer via a heating element and a fan disposed downstream thereof.

The advantages attainable by the process of this invention are based, in particular, on the fact that no foreign gas need be employed in the entire working-up procedure to which the suspended synthetic resin powder is subjected, i.e., during the centrifuging and drying. These advantages avoid expenses for metering the feed of the foreign gas into the dryer cycle and analyzing the foreign gas then present within the cycle, as well as the attendant separation of the foreign gas from the residual liquefied gas which was removed from the synthetic resin powder. The combination of all these factors affects the economy of the entire process of synthetic resin powder production in a favorable manner.

BRIEF DESCRIPTION OF THE DRAWINGS

One embodiment of the process of this invention will be described in greater detail hereinafter with reference to the attendant drawing which depicts said embodiment.

DETAILED DESCRIPTION OF THE INVENTION

As shown, liquefied gas suspension 1 is continuously introduced into decanting centrifuge 2 which is pressure-sealed by encapsulation and under an internal superatmospheric pressure. All housing and rotor parts of the centrifuge are sealed with respect to the atmosphere, the rotor being provided with slip ring seals. The centrifuged liquefied gas filtrate flows from the filtrate discharge pipe of decanting centrifuge 2 into filter receiver 3, which is also under an internal superatmospheric pressure, from which the filtrate is removed by pumping.

The powder, moist from the centrifugation, falls from the power discharge pipe of the decanting centrifuge into a gas convection dryer, in this embodiment a current dryer 4, which dryer is under an internal superatmospheric pressure. Here, the powder with its adhering liquefied gas moisture is dried.

The internal superatmospheric pressure is essentially the same throughout the entire system, except for minor pressure gradients, and has a value which can be adjusted between 0.5 and 15 atmospheres gauge.

According to the invention, the same liquefied gas, but in the gaseous, superheated condition, is employed as the drying medium.

The powder, moist from centrifuge 2, is entrained, in pressurized current dryer 4 by the flowing gaseous liquefied gas and dried on its way to cyclone 5. The powder separated in cyclone 5 falls downwardly into lock 6, which brings the powder to atmospheric pressure under expansion of liquefied gas. The gaseous stream from cyclone 5 is fed to cyclone 7, the latter effecting a supplemental precipitation of powder, and conveying the same together with a proportion of the gaseous liquefied gas, to condenser 8. The amount of liquefied gas flowing to condenser 8 is adjusted by pressure control device 9. The powder-containing condensate is collected in tank 10 and pumped from there back to decanting centrifuge 2. The gaseous stream from cyclone 7 is recycled to the powder feed point via heating unit 11 and circulating fan 12.

The entire system is under superatmospheric pressure correlated, in correspondence with the vapor pressure curve of the liquefied gas utilized, with the condensation temperature thereof which is ambient in condenser 8. This pressure is adjusted and maintained with the aid of pressure control device 9. The condensation pressure in condenser 8 must be kept somewhat lower, due to the pressure drop at regulating valve 9, than the pressure in the gas cycle — i.e., for example, in cyclone 7.

If the superatmospheric pressure is set to be correspondingly high, for example around 5 atmospheres gauge, the condenser can be operated at a higher temperature level and thus the cooling of the condenser can be effected economically with water instead of cooling brine.

The condensate from condenser 8 and tank 10 can contain a certain proportion of polymer powder. The condensate is conducted to decanting centrifuge 2 where the powder is recovered. Since the condensate can contain a proportion of powder, there is no necessity for filtering the gaseous liquefied gas prior to the condensation, i.e., for example to conduct same through filter hoses.

According to the process of this invention, the condensation for recovering the liquefied gas vaporized from the powder in the gas convection dryer does not take place — as customary — in the gas cycle of the gas convection dryer, but in a secondary cycle. In this process, gaseous liquefied gas is branched off from the gas cycle and fed to the condenser. The branched-off quantity corresponds to that amount of liquefied gas which passes through the powder discharge pipe of the decanting centrifuge into the gas convection dryer together with the powder. Thereby, the liquefied gas filling and the internal pressure of the system are kept constant.

The drying process of this invention for polymer powders with adhering liquefied gas moisture by means of the same liquefied gas, but in gaseous form, can also be conducted in accordance with the conventional processes designed for inert substances as the drying medium, if high pressures can be realized. However, in this procedure one would encounter the problem of the uneconomical cooling of the entire amount of circulated gas, in combination with the subsequent reheating of almost 90 percent of the previously cooled gas quantity.

In the application of the process of this invention to liquefied gas suspensions of polymers polymerized with Ziegler catalysts and subsequently subjected to an extraction with alcohol and/or water, it is advantageous to feed a minor amount of ammonia uniformly into the gas convection dryer, since this prevents localized corrosion and tension crack corrosion on the metallic parts of the dryer which often occur due to the aggressive decomposition products of the Ziegler catalysts. The amount of ammonia is to be selected so that approximately a stoichiometric reaction of the ammonia with the free halide ions takes place. The drawing shows conduit 13 provided for the introduction of the ammonia between fan 12 and the feed point for powder moist with liquefied gas into gas convection dryer 4.

EXAMPLE

In a plant according to the schematic representation of the drawing, 2 tons per hour of a liquefied gas suspension were worked up, having the following composition (expressed in % by weight):

| | |
|---|---|
| 1-Butylene | about 55 |
| 2-Butylene | about 15 |
| Butane | about 13.5 |
| Polybutene, isotactic | 15 |
| Polybutene, atactic | 1.5 |
| Chlorine-containing compounds (catalytic residues) | 0.005 |

The liquefied gas suspension conveyed into the decanting centrifuge was highly viscous and had a temperature of +20° C.

The decanting centrifuge had the following characteristics:

| | |
|---|---|
| Drum diameter- | 420 mm. |
| Drum length- | 1,200 mm. |
| Main speed- | 3,200 r.p.m. |
| Screw speed- | 3,152 r.p.m. |
| Operating pressure- | 2.2 atmospheres gauge |
| Seal- | slip rings |

From the decanting centrifuge, 1,587 kg./hour of filtrate was discharged, containing 27 kg. of atactic polybutene.

The polymer powder exited from the powder outlet with a residual moisture of 27 percent by weight (liquefied gas). kcal/h.

The current dryer had the following operating characteristics:

| | |
|---|---|
| Length of drying zone- | 26.5 m. |
| Diameter of the pipe along this zone- | 150 mm. |
| Flow velocity of the gaseous liquefied gas along this zone- | 5 m./sec. |
| Temperature of the gaseous liquefied gas upstream of powder entrance after the fan | +64° C. |
| Internal pressure in the drying zone- | 2.2 atm. gauge |
| Condensation pressure in the condenser- | 2.0 atm. gauge |
| Condensation temperature in the condenser- | +23° C. |
| Ammonia feed- | 10 g./h. |
| Coolant consumption at the condenser- | 15,000 kcal.h. |
| Steam consumption in the heating unit- | 0.03 tons/hour |

The powder discharged through the lock 6 had a residual moisture of 0.1 - 0.5 percent by weight. It contained maximally 1 percent by weight of the atatic material.

Even after an operation of the plant for several months, no corrosions occurred.

It is understood that the embodiment disclosed herein is susceptible to numerous changes and modifications, as will be apparent to a person skilled in the art. Accordingly, the present invention is not limited to the details shown and described herein but intended to cover any such changes and modifications within the scope of the invention.

We claim:

1. A process for obtaining a dry thermoplastic synthetic resin powder from suspensions of powdery polymers in liquefied gases, which comprises separating said suspension under superatmospheric pressure into a liquefied gas and a powder moist with said liquefied gas, contacting said powder moist with said liquefied gas with a superheated gaseous phase of said liquefied gas to entrain said powder therein, separating said powder from the gaseous phase to obtain the dry thermoplastic synthetic resin powder, condensing the gaseous phase separated from said powder to a proportion equal to that of the liquefied gas moistening said powder after the initial separating step, reintroducing the condensed portion into the original suspension, and heating and returning the uncondensed portion to said powder moist with said liquefied gas.

2. The process of claim 1 wherein said superatmospheric pressure is from about 0.5 to about 15 atmospheres gauge.

3. The process of claim 2 wherein the initial separation step comprises a centrifuging operation.

4. The process of claim 3 wherein ammonia is fed to said super-heated gaseous phase of said liquefied gas.

5. The process of claim 1 wherein the step of separating said powder from the gaseous phase is achieved by a cyclone operation.

6. The process of claim 1 wherein said powder is cyclonically separated from the gaseous phase as a bottoms product and the gaseous phase is subjected to a further cyclonic separation, the bottoms product of which is subjected to the condensation step and the overhead of which forms said uncondensed portion.

7. An apparatus for obtaining dry thermoplastic synthetic resin powders from suspensions of powdery polymers in liquefied gases which comprises centrifuge means, including a filtrate draw-off pipe and a powder discharge pipe, for separating said suspension into a liquefied gas filtrate exiting through said filtrate draw-off pipe and a powder moist with said liquefied gas exiting through said powder discharge pipe, drying means connected to said powder discharge pipe of said centrifuge means for drying said powder moist with said liquefied gas by employing a gaseous current of said liquefied gas, first cyclone means, having gas and solids outlets, connected to said drying means for separating the mixture issuing therefrom into said dry thermoplastic synthetic resin powder exiting through said solids outlet and a gaseous phase exiting through said gas outlet, second cyclone means, having gas and solid outlets, connected to said gas outlet of said first cyclone means for separating said gaseous phase into a heavy phase exiting through said solids outlet and a light phase exiting through said gas outlet, said gas outlet being connected to said drying means to supply said light phase to said drying means as a gaseous current of said liquefied gas, and condensing means connected between said solids outlet of said second cyclone means and said centrifuge means for condensing said heavy phase.

8. The apparatus of claim 7 further comprising a filtrate vessel connected to said filtrate draw-off pipe of said centrifuge means.

9. The apparatus of claim 7 further comprising a pressure lock connected at one end to said solids outlet of said first cyclone means, the other end communicating with the atmosphere.

10. The apparatus of claim 7 further comprising a pressure control valve connected between said solids outlet of said second cyclone means and said condensing means.

11. The apparatus of claim 7 further comprising a condensate tank and a pump serially connected between said condensing means and said centrifuge means.

12. The apparatus of claim 7 further comprising a heating element and a fan serially disposed between said gas outlet and said drying means.

13. The apparatus of claim 7 wherein said drying means is a gas convection dryer.

14. The apparatus of claim 13 wherein said dryer is a current dryer.

15. The apparatus of claim 7 further comprising a filtrate vessel connected to said filtrate draw-off pipe of said centrifuge means, a pressure lock connected at one end to said solids outlet of said first cyclone means, the other end communicating with the atmosphere, a pressure control valve connected between said solids outlet of said second cyclone means and said condensing means, a condensate tank and a pump serially connected between said condensing means and said centrifuge means, a heating element and a fan serially disposed between said gas outlet and said drying means.

* * * * *